(12) United States Patent
Wang et al.

(10) Patent No.: US 9,025,267 B1
(45) Date of Patent: May 5, 2015

(54) DATA STORAGE DEVICE USING BRANCH METRIC FROM ADJACENT TRACK TO COMPENSATE FOR INTER-TRACK INTERFERENCE

(71) Applicant: Western Digital Technologies, Inc., Irvine, CA (US)

(72) Inventors: Alvin J. Wang, Fremont, CA (US); Shafa Dahandeh, Laguna Niguel, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/299,309

(22) Filed: Jun. 9, 2014

(51) Int. Cl.
*G11B 5/02* (2006.01)
*G11B 20/18* (2006.01)
*G11B 20/10* (2006.01)

(52) U.S. Cl.
CPC .......... *G11B 20/18* (2013.01); *G11B 20/10379* (2013.01); *G11B 5/02* (2013.01)

(58) Field of Classification Search
CPC .................................... G11B 5/02; G11B 5/29
USPC .................. 360/63, 39, 55, 64, 246.6, 53
See application file for complete search history.

(56) References Cited

U.S. PATENT DOCUMENTS

| | | | |
|---|---|---|---|
| 5,229,901 A | 7/1993 | Mallary | |
| 5,661,760 A * | 8/1997 | Patapoutian et al. | 375/341 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,104,765 A * | 8/2000 | Fredrickson | 375/340 |
| 6,105,104 A | 8/2000 | Guttmann et al. | |
| 6,111,717 A | 8/2000 | Cloke et al. | |
| 6,145,052 A | 11/2000 | Howe et al. | |
| 6,154,335 A | 11/2000 | Smith et al. | |
| 6,157,510 A | 12/2000 | Schreck et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |

(Continued)

OTHER PUBLICATIONS

K. S. Chan, R. Radhakrishnan, K. Eason, R. M. Elidrissi1, J. Miles, B. Vasic and A. R. Krishnan, "Channel models and detectors for two-dimensional magnetic recording (TDMR)," IEEE Trans. Magn., vol. 46, No. 3, Mar. 2010.

(Continued)

*Primary Examiner* — Thomas Alunkal

(57) ABSTRACT

A data storage device is disclosed comprising a disk comprising a plurality of data tracks, and a head comprising a first read element and a second read element. A first data track is read using the first read element to generate a first read signal, and the first read signal is sampled to generate first signal samples. A first branch metric is generated in a first trellis sequence detector when detecting a first data sequence based on one of the first signal samples. A second data track adjacent the first data track is read using the second read element to generate a second read signal, and the second read signal is sampled to generate second signal samples. A second branch metric is generated in a second trellis sequence detector when detecting a second data sequence based on one of the second signal samples and the first branch metric.

14 Claims, 4 Drawing Sheets

(56) References Cited

U.S. PATENT DOCUMENTS

| | | |
|---|---|---|
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,345,074 B1 * | 2/2002 | Turk et al. ............... 375/341 |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,110 B1 * | 9/2002 | DeGroat et al. ........... 360/46 |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,545,836 B1 * | 4/2003 | Ioannou et al. ........... 360/77.06 |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,140 B2 | 11/2004 | Brommer et al. |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |

(56) References Cited

U.S. PATENT DOCUMENTS

| | | |
|---|---|---|
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,549 B2 | 9/2006 | Asakura |
| 7,106,947 B2 | 9/2006 | Boyle et al. |
| 7,110,202 B1 | 9/2006 | Vasquez |
| 7,111,116 B1 | 9/2006 | Boyle et al. |
| 7,111,225 B2 | 9/2006 | Coene et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,259,927 B2 | 8/2007 | Harris |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,738,202 B1 * | 6/2010 | Zheng et al. ............... 360/46 |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,872,823 B2 | 1/2011 | Liu et al. |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |

(56) References Cited

U.S. PATENT DOCUMENTS

| | | | |
|---|---|---|---|
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,339 B1 | 10/2012 | Nangare et al. |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,750 B1 | 5/2013 | Nangare et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,578,253 B1 | 11/2013 | Yang et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,508 B1 * | 12/2013 | Burd ............................. 360/39 |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,638,513 B1 | 1/2014 | Burd |
| 8,659,846 B2 | 2/2014 | Kumar et al. |
| 8,661,193 B1 | 2/2014 | Cobos et al. |
| 8,665,543 B2 | 3/2014 | Bellorado et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,780,472 B2 * | 7/2014 | Okubo et al. ............ 360/45 |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,804,260 B2 * | 8/2014 | Mathew et al. ............ 360/45 |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,830,613 B2 | 9/2014 | Lund et al. |
| 2001/0030822 A1 * | 10/2001 | Boutaghou et al. ............ 360/25 |
| 2003/0026020 A1 * | 2/2003 | Buckingham ............ 360/48 |
| 2007/0085709 A1 | 4/2007 | Coene et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |

(56) References Cited

U.S. PATENT DOCUMENTS

2012/0275050 A1 11/2012 Wilson et al.
2012/0281963 A1 11/2012 Krapf et al.
2012/0324980 A1 12/2012 Nguyen et al.

OTHER PUBLICATIONS

T. Losuwan, C. Warisarn, P. Supnithi, and P. Kovintavewat, "A Study of 2D detection for Two-Dimensional Magnetic Recording," in Proc. of ITC-CSCC 2012, Jul. 15-18, 2012, Sapporo, Japan.

S. Nabavi, B. V. K. V. Kumar, "Two-Dimensional Generalized Partial Response Equalizer for Bit-Patterned Media," IEEE Trans. Magn., vol. 44, No. 11, pp. 3789-3792, Nov. 2008.

Yunxiang Wu, Joseph A. O'Sullivan, Naveen Singla, and Ronald S. Indeck, "Iterative Detection and Decoding for Separable Two-Dimensional Intersymbol Interference," IEEE Transactions on Magnetics, vol. 39, No. 4, Jul. 2003.

Alvin J. Wang, et al., U.S. Appl. No. 14/089,912, filed Nov. 26, 2013, 19 pages.

Alvin J. Wang, et al., U.S. Appl. No. 14/178,155, filed Feb. 11, 2014, 25 pages.

Yiming Chen, et al., U.S. Appl. No. 13/968,323, filed Aug. 15, 2013, 19 pages.

\* cited by examiner

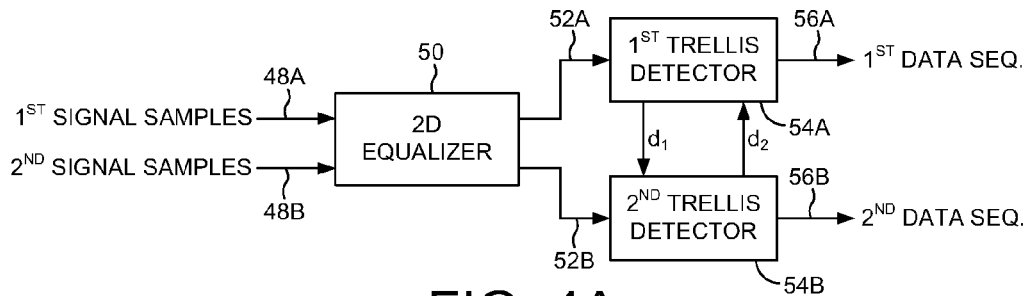
FIG. 4A
$$BM_1 = \|y_1(k) - d_1\|^2$$
$$BM_2 = \|y_2(k) - d_2 - \alpha d_1\|^2$$
$$BM_1 = \|y_1(k) - d_1 - \alpha d_2\|^2$$
$$BM_2 = \|y_2(k) - d_2 - \alpha d_1\|^2$$
$$BM_1 = \|y_1(k) - d_1 - \alpha d_2\|^2$$
FIG. 4B
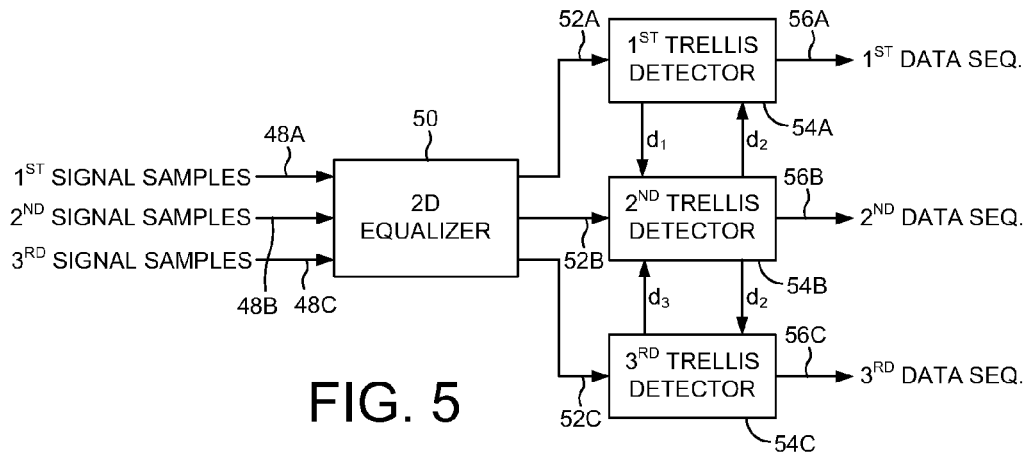
FIG. 5

DATA STORAGE DEVICE USING BRANCH METRIC FROM ADJACENT TRACK TO COMPENSATE FOR INTER-TRACK INTERFERENCE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

Data is typically written to data sectors within a data track by modulating the write current of a write element, for example, using a non-return to zero (NRZ) signal, thereby writing magnetic transitions onto the disk surface. A read element (e.g., a magnetoresistive (MR) element) is then used to transduce the magnetic transitions into a read signal that is demodulated by a read channel. The recording and reproduction process may be considered a communication channel, wherein communication demodulation techniques may be employed to demodulate the read signal.

When reading data from the disk, a read channel typically samples the read signal to generate signal samples that are equalized according to a target response (e.g., a partial response). A sequence detector (e.g., a Viterbi detector) detects an estimated data sequence from the equalized samples, and errors in the estimated data sequence are corrected, for example, using a Reed-Solomon error correction code (ECC) or using a Low Density Parity Check (LDPC) code.

BRIEF DESCRIPTION OF THE DRAWINGS

FIG. 4A illustrates an embodiment wherein the signal samples are equalized using a two-dimensional (2D) equalizer, and the equalized samples processed by respective trellis sequence detectors.

FIG. 4B illustrates an embodiment wherein when generating the branch metrics, each trellis sequence detector iterates based on the branch selected by the other trellis sequence detector.

FIG. 5 shows an embodiment wherein the head comprises three read elements for generating a read signal from three adjacent data tracks, and three trellis sequence detectors that iterate based on the branches selected in the adjacent trellis sequence detectors.

DETAILED DESCRIPTION

Figure 1:
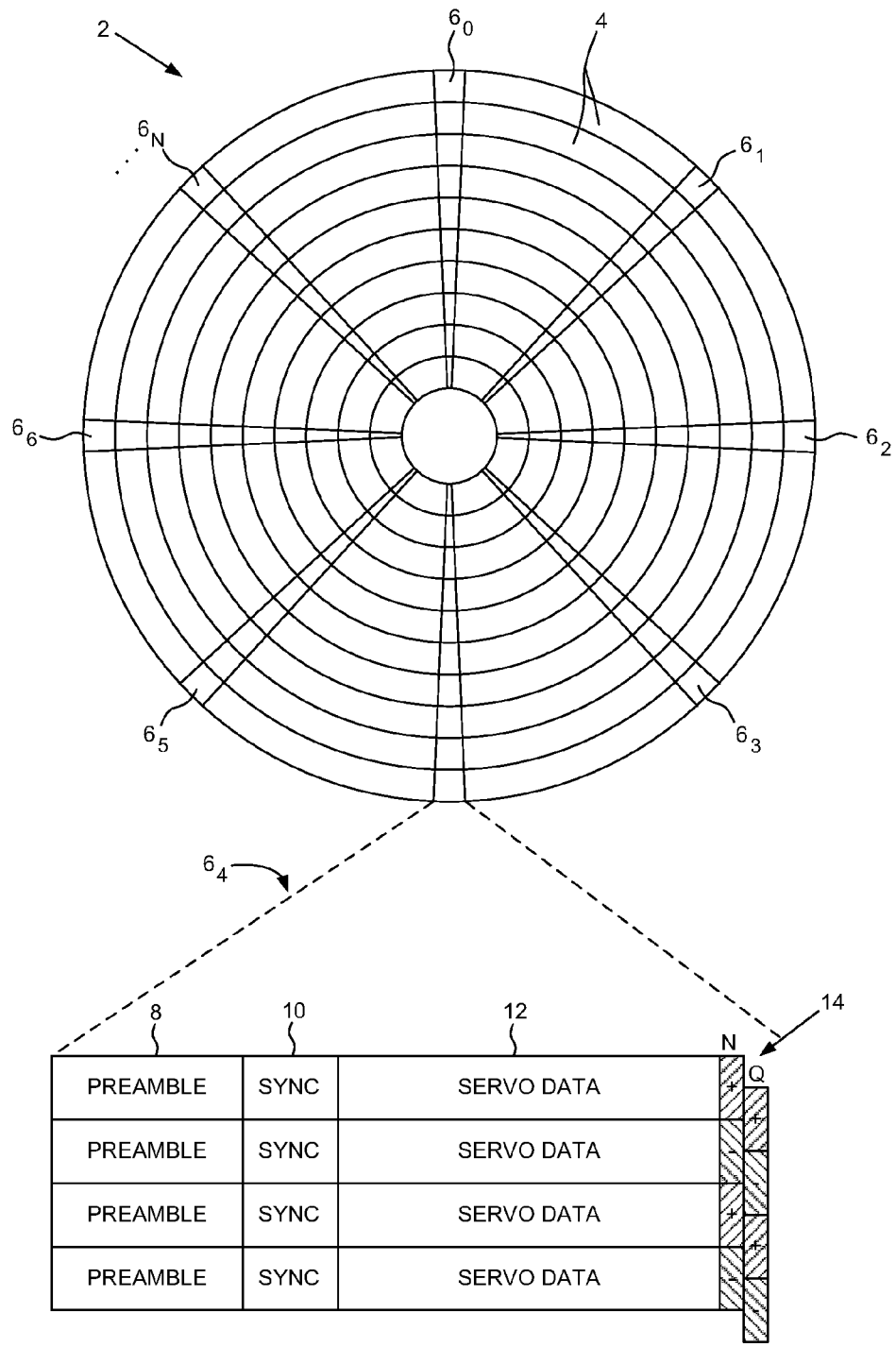
FIG. 1 shows a prior art disk format comprising servo tracks defined by servo sectors.
Figure 2A:
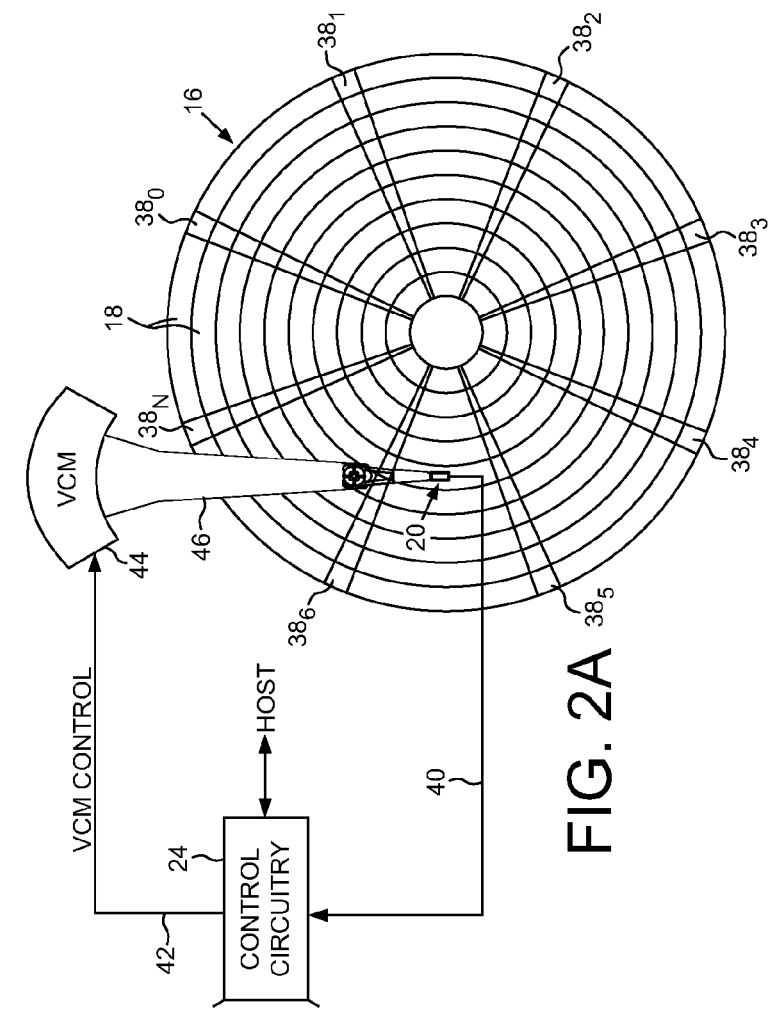
FIG. 2A shows a data storage device in the form of a disk drive according to an embodiment comprising a head actuated over a disk.
Figure 2B:
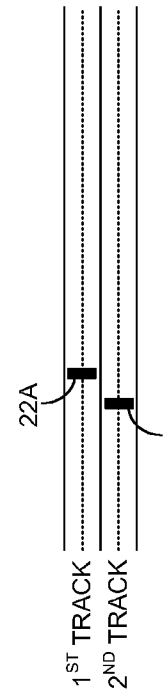
FIG. 2B shows an embodiment wherein the head comprises a first read element positioned over a first data track and a second read element positioned over a second data track.

FIG. 2A shows a data storage device in the form of a disk drive according to an embodiment comprising a disk 16 comprising a plurality of data tracks 18, and a head 20 actuated over the disk 16, the head 20 comprising a plurality of read elements including a first read element 22A and a second read element 22B (FIG. 2B). The disk drive further comprises control circuitry 24 configured to execute the flow diagram of FIG. 2C, wherein a first data track (FIG. 2B) is read using the first read element to generate a first read signal (block 26), and the first read signal is sampled to generate first signal samples (block 28). A first branch metric is generated in a first trellis sequence detector when detecting a first data sequence based on one of the first signal samples (block 30). A second data track adjacent the first data track (FIG. 2B) is read using the second read element to generate a second read signal (block 32), and the second read signal is sampled to generate second signal samples (block 34). A second branch metric is generated in a second trellis sequence detector when detecting a second data sequence based on one of the second signal samples and the first branch metric (block 36).

In the embodiment of FIG. 2A, a plurality of concentric servo tracks are defined by embedded servo sectors $38_0$-$38_N$, wherein the data tracks 18 are defined relative to the servo tracks at the same or different radial density. The control circuitry 24 processes at least one read signal 40 emanating from the head 20 to demodulate the servo sectors and generate a position error signal (PES) representing an error between the actual position of the head and a target position relative to a target track. The control circuitry 24 filters the PES using a suitable compensation filter to generate a control signal 42 applied to a voice coil motor (VCM) 44 which rotates an actuator arm 46 about a pivot in order to actuate the head 20 radially over the disk 16 in a direction that reduces the PES. The control circuitry 24 may also generate a control signal applied to a microactuator (not shown) in order to actuate the head 20 over the disk 16 in fine movements. Any suitable microactuator may be employed, such as a piezoelectric actuator. In addition, the microactuator may actuate the head 20 over the disk 16 in any suitable manner, such as by actuating a suspension relative to the actuator arm, or actuating a slider relative to the suspension. The servo sectors $38_0$-$38_N$ may comprise any suitable head position information, such as a track address for coarse positioning and servo bursts for fine positioning. The servo bursts may comprise any suitable pattern, such as an amplitude based servo pattern or a phase based servo pattern.

Figure 3A:
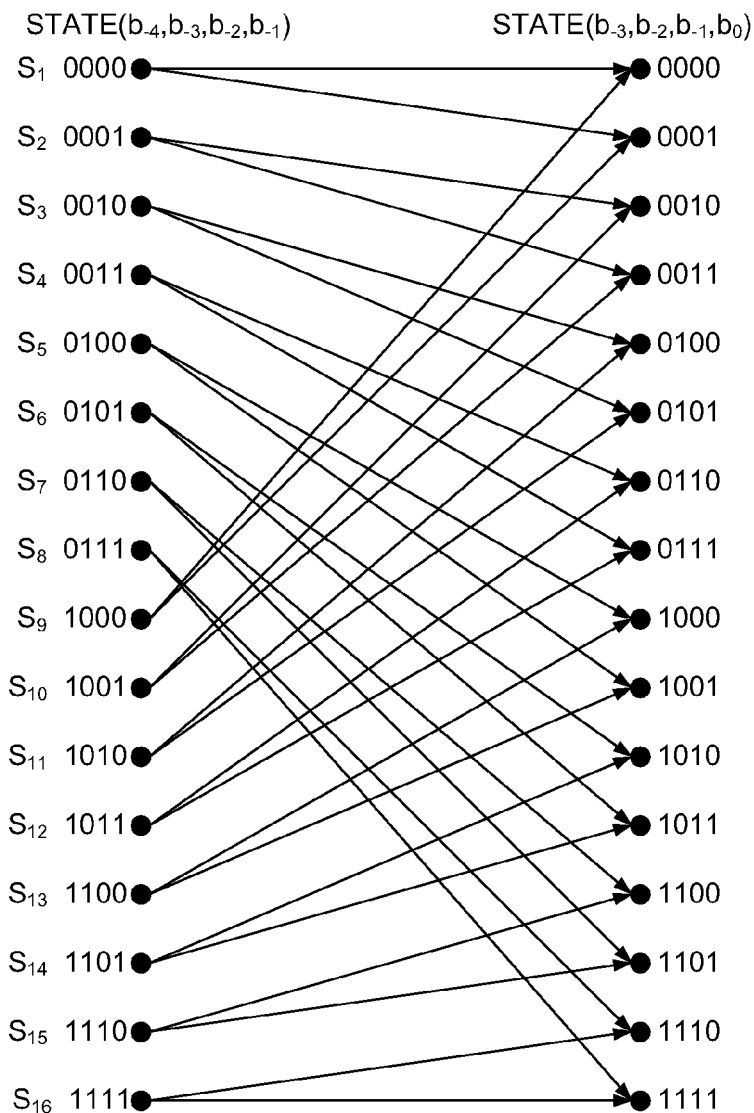
FIG. 3A shows an example state transition diagram for a sixteen state trellis sequence detector according to an embodiment.

The data is typically recorded in a data track using partial response signaling meaning that the waveform response of each recorded bit overlaps with the waveform response of one or more of the linear adjacent bits resulting in a controlled amount of downtrack interference (DTI) in the read signal (also referred to as intersymbol interference (ISI)). Demodulating the read signal involves sampling the read signal and estimating a data sequence based on the likelihood that the signal samples correspond to the expected samples of a possible data sequences. To facilitate this demodulation, a trellis type sequence detector is typically employed comprising a state machine that corresponds to the possible data sequences based on the length of the DTI (number of bits affected). FIG. 3A shows an example state transition diagram for a sixteen state trellis that corresponds to a DTI length of four bits. At any given state, a branch metric is computed (e.g., a Euclidean metric) representing a likelihood of the next downtrack bit being a "0" or a "1". As the bits in the read signal are evaluated, a number of survivor sequences are tracked through the corresponding trellis which eventually merge into a most likely data sequence based on the accumulated branch metrics for each survivor sequence.

Figure 3B:
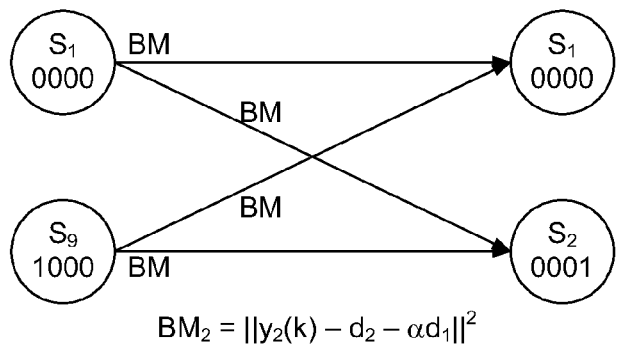
FIG. 3B illustrates an embodiment for generating the branch metrics for the branch transitions of two states of a second trellis sequence detector based on an expected sample corresponding to a branch selected by a first trellis sequence detector.

As the data tracks 20 are squeezed closer together in an attempt to increase the capacity of the disk 16, the data bits recorded in the first data track may induce an intertrack interference (ITI) in the read signal of the second data track (and vise versa). Accordingly, in one embodiment a trellis type sequence detector is employed that takes into account the intertrack interference caused by the data sequence recorded in at least one adjacent data track. FIG. 3B illustrates an example embodiment wherein a second branch metric (BM) computed for each state of the state transition diagram of a second trellis sequence detector is computed based on an expected sample corresponding to a first branch selected by a first trellis sequence detector. In this example, the second branch metric ($BM_2$) is computed as a Euclidean metric:

$$BM_2 = \|2(k) - d_2 - \alpha d_1\|^2$$

where $y_2(k)$ represents a second signal sample generated by sampling a second read signal, $d_2$ represents a second expected sample corresponding to a second branch of the second trellis sequence detector, $d_1$ represents a first expected sample corresponding to a first branch selected by the first trellis sequence detector based on a first branch metric when detecting a first data sequence, and $\alpha$ is a scalar. In an embodiment described below, the second branch metric ($BM_2$) may also be computed based on an expected sample corresponding to a third branch of a third trellis detector configured to detect a third data sequence in a third data track adjacent the second data track.

In the above Euclidean metric equation, the expected sample $d_1$ of the adjacent data track is scaled by a scalar $\alpha$ to account for the degree the ITI affects the read signal sample of the second data track as determined by the radial spacing of the first data track relative to the second data track. That is, the scalar $\alpha$ increases as the spacing between the data tracks decreases. In one embodiment, the scalar $\alpha$ may be calibrated during a manufacturing procedure, and/or tuned during normal read operations such as during retry operations. For example, the scalar $\alpha$ may be tuned relative to a suitable quality metric, such as a bit error rate of the sequence detector. In one embodiment, the spacing of the data tracks may vary over the radius of the disk, and/or the spacing between the read elements may change as the skew angle of the head changes, and therefore the scalar $\alpha$ may be calibrated and then configured during normal read operations based on the radial location of the head.

FIG. 4A shows control circuitry according to an embodiment wherein the first signal samples 48A of the first read signal and the second signal samples 48B of the second read signal are equalized by a two-dimensional (2D) equalizer 50 to generate first equalized samples 52A and second equalized samples 52B. A first trellis sequence detector 54A processes the first equalized samples 52A to detect a first data sequence 56A, and a second trellis sequence detector 54B processes the second equalized samples 52B to detect a second data sequence 56B. During the sequence detection process when each trellis sequence detector reaches a particular point in the trellis corresponding to a particular signal sample y(k) of each data track, the trellis sequence detectors 54A and 54B pass an expected sample d to the other trellis sequence detector, where the expected sample d corresponds to a branch that would be selected by the other trellis sequence detector. In one embodiment, the trellis sequence detectors 54A and 54B may iterate on the expected samples d until both trellis sequence detectors converge to a final answer for the branch metrics.

FIG. 4B illustrates an example of this embodiment wherein the first trellis sequence detector 54A processes a signal sample $y_1(k)$ to select a first branch metric $BM_1$ based on an expected sample $d_1$ corresponding to each branch (e.g., selects one of two branches based on the minimum branch metric). The expected sample $d_1$ corresponding to the first branch metric $BM_1$ is passed to the second trellis sequence detector 54B which processes a signal sample $y_2(k)$ to select a second branch metric $BM_2$ based on an expected sample $d_2$ corresponding to each branch as well as the expected sample $d_1$ received from the first trellis sequence detector 54A. The expected sample $d_2$ corresponding to the second branch metric $BM_2$ is passed to the second trellis sequence detector 54B which updates the computations of the first branch metric for each branch as illustrated in FIG. 4B. After updating the branch metrics based on the expected sample $d_2$ received from the second trellis sequence detector 54B, the first trellis sequence detector 54A may select a different branch corresponding to a different branch metric $BM_1$ and corresponding different expected sample $d_1$. The updated expected sample $d_1$ is then passed to the second trellis sequence detector 54B which updates its branch metrics accordingly. This process may be iterated any number of times, for example, until both trellis sequence detectors 54A and 54B converge to a final answer for the best branch to select.

Figure 2C:
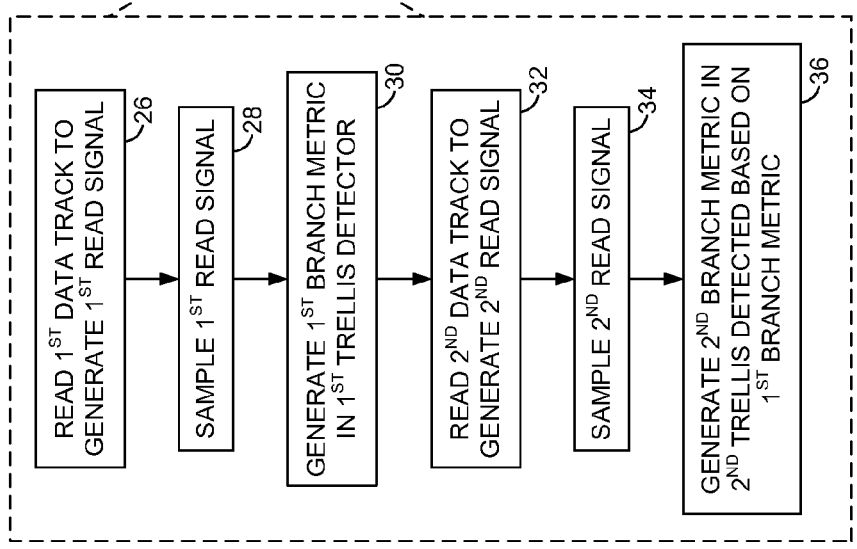
FIG. 2C is a flow diagram according to an embodiment wherein a second branch metric in a second trellis sequence detector is generated when detecting a second data sequence based on second signal samples and a first branch metric generated by a first trellis sequence detector.

FIG. 2C illustrates an embodiment wherein the first read element 24A may be offset from the second read element 24B by a downtrack spacing as well as a cross-track spacing. Accordingly, in one embodiment the control circuitry may compensate for the downtrack spacing by time aligning (through a delay) the signal samples of the first and second read signals prior to, or as part of, the 2D equalizer 50 shown in FIG. 4A. In one embodiment, the signal samples from one or both read signals may be buffered to facilitate the time aligning of the signals.

In one embodiment, buffering the signal samples may also compensate for the latency of the trellis sequence detectors 54A and 54B due to the iterations when computing the branch metrics as described above. In one embodiment, the number of iterations allowed for each signal sample may also be limited based on the free space available in the signal samples buffer. That is, as the free space decreases due to the latency of the trellis sequence detectors 54A and 54B, the number of iterations allowed at each signal sample may be reduced. In yet another embodiment, the number of iterations may range from zero to N based on a confidence metric associated with each branch metric selected. For example, if the difference between the branch metrics for two branches is significant, indicating a high confidence in the minimum branch metric, then to reduce the latency the trellis sequence detectors 54A and 54B may skip the step of updating the branch metrics based on expected samples passed between the trellis sequence detectors as described above.

FIG. 5 shows an embodiment wherein head 20 comprises a third read element and the control circuitry 24 is further configured to read a third data track using the third read element to generate a third read signal, and sample the third read signal to generate third signal samples 48C. A third branch metric is generated in a third trellis sequence detector 54C when detecting a third data sequence 56C based on one of the third signal samples 48C. The second branch metric is generated in the second trellis sequence detector 54B when detecting the second data sequence 56B based on one of the second signal samples 48B, the first branch metric, and the third branch metric. In one embodiment, the second trellis sequence detector 54B is configured to generate the second branch metric when detecting the second data sequence 56B based on a third expected sample $d_3$ corresponding to a third branch selected by the third trellis sequence detector 54C based on the third branch metric when detecting the third data sequence 56C. Similarly, the third trellis sequence detector 54C may be configured to generate the third branch metric when detecting the third data sequence 56B based on the second expected sample $d_2$ corresponding to the second branch selected by the second trellis sequence detector 54B based on the second branch metric when detecting the second data sequence 56B. In one embodiment, the three trellis sequence detectors 54A-54C shown in FIG. 5 may iterate any suitable number of times as described above with reference to FIG. 4B.

In one embodiment, the 2D equalizer 50 shown in the examples of FIGS. 4A and 5 may equalize the signal samples to generate one-dimensional (1D) equalized samples processed by 1D trellis sequence detectors. That is, the 2D equalizer 50 may perform 2D-to-1D equalization, and the trellis sequence detectors may perform 1D sequence detection based on a single stream of equalized samples corresponding to a single data track. In another embodiment, the 2D equalizer 50 may comprise a 2D-to-2D equalizer that equalizes the signal samples to generate 2D equalized samples processed by 2D trellis sequence detectors. That is, the trellis sequence detectors may perform 2D sequence detection based on multiple (e.g., two or three) streams of equalized samples corresponding to multiple data tracks.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

While the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of data tracks;
   a head actuated over the disk, the head comprising a plurality of read elements including a first read element and a second read element; and
   control circuitry configured to:
      read a first data track using the first read element to generate a first read signal;

sample the first read signal to generate first signal samples;

generate a first branch metric in a first trellis sequence detector when detecting a first data sequence based on one of the first signal samples;

read a second data track adjacent the first data track using the second read element to generate a second read signal;

sample the second read signal to generate second signal samples; and when detecting a second data sequence, generate a second branch metric in a second trellis sequence detector based on one of the second signal samples and the first branch metric.

2. The data storage device as recited in claim 1, wherein the control circuitry is further operable to generate the second branch metric based on:

$$BM_2 = \|y_2(k) - d_2 - \alpha d_1\|^2$$

where:

$d_1$ represents a first expected sample corresponding to a first branch selected by the first trellis sequence detector based on the first branch metric when detecting the first data sequence;

$\alpha$ is a scalar;

$y_2(k)$ represents one of the second signal samples;

$d_2$ represents a second expected sample corresponding to a second branch of the second trellis sequence detector; and $BM_2$ represents the second branch metric.

3. The data storage device as recited in claim 1, wherein the first trellis sequence detector is configured to generate the first branch metric when detecting the first data sequence based on one of the first signal samples and the second branch metric.

4. The data storage device as recited in claim 3, wherein the first trellis sequence detector is configured to generate the first branch metric when detecting the first data sequence based on a second expected sample corresponding to a second branch selected by the second trellis sequence detector based on the second branch metric when detecting the second data sequence.

5. The data storage device as recited in claim 3, wherein the control circuitry is further configured to iterate the generating the first branch metric and the second branch metric at least twice.

6. The data storage device as recited in claim 1, wherein the head comprises a third read element and the control circuitry is further configured to:

read a third data track using the third read element to generate a third read signal;

sample the third read signal to generate third signal samples;

generate a third branch metric in a third trellis sequence detector when detecting a third data sequence based on one of the third signal samples; and generate the second branch metric in the second trellis sequence detector when detecting the second data sequence based on one of the second signal samples, the first branch metric, and the third branch metric.

7. The data storage device as recited in claim 6, wherein the second trellis sequence detector is configured to generate the second branch metric when detecting the second data sequence based on a third expected sample corresponding to a third branch selected by the third trellis sequence detector based on the third branch metric when detecting the third data sequence.

8. A method of operating a data storage device, the method comprising:

reading a first data track on a disk using a first read element of a head to generate a first read signal;

sampling the first read signal to generate first signal samples;

generating a first branch metric in a first trellis sequence detector when detecting a first data sequence based on one of the first signal samples;

reading a second data track adjacent the first data track using a second read element of the head to generate a second read signal;

sampling the second read signal to generate second signal samples; and when detecting a second data sequence, generating a second branch metric in a second trellis sequence detector based on one of the second signal samples and the first branch metric.

9. The method as recited in claim 8, further comprising generating the second branch metric based on:

$$BM_2 = \|y_2(k) - d_2 - \alpha d_1\|^2$$

where:

$d_1$ represents a first expected sample corresponding to a first branch selected by the first trellis sequence detector based on the first branch metric when detecting the first data sequence;

$\alpha$ is a scalar;

$y_2(k)$ represents one of the second signal samples;

$d_2$ represents a second expected sample corresponding to a second branch of the second trellis sequence detector; and $BM_2$ represents the second branch metric.

10. The method as recited in claim 8, further comprising the first trellis sequence detector generating the first branch metric when detecting the first data sequence based on one of the first signal samples and the second branch metric.

11. The method as recited in claim 10, further comprising the first trellis sequence detector generating the first branch metric when detecting the first data sequence based on a second expected sample corresponding to a second branch selected by the second trellis sequence detector based on the second branch metric when detecting the second data sequence.

12. The method as recited in claim 10, further comprising iterating the generating the first branch metric and the second branch metric at least twice.

13. The method as recited in claim 8, further comprising:

reading a third data track using a third read element of the head to generate a third read signal;

sampling the third read signal to generate third signal samples;

generating a third branch metric in a third trellis sequence detector when detecting a third data sequence based on one of the third signal samples; and generating the second branch metric in the second trellis sequence detector when detecting the second data sequence based on one of the second signal samples, the first branch metric, and the third branch metric.

14. The method as recited in claim 13, further comprising the second trellis sequence detector generating the second branch metric when detecting the second data sequence based on a third expected sample corresponding to a third branch selected by the third trellis sequence detector based on the third branch metric when detecting the third data sequence.

* * * * *